(12) United States Patent
Kayser et al.

(10) Patent No.: US 6,254,975 B1
(45) Date of Patent: Jul. 3, 2001

(54) CERAMIC COMPOSITE

(75) Inventors: Ursula Kayser, Immenstaad; Tilman Haug, Muehlhofen; Doris Hertel, Friedrichshafen; Kolja Rebstock, Ulm; Wolfgang Schaefer; Helmut Knabe, both of Friedrichshafen; Walter Vogel, Salem-Neufrach, all of (DE)

(73) Assignee: Dornier GmbH, Friedrichshafen (DE)

( * ) Notice: Subject to any disclaimer, the term of this patent is extended or adjusted under 35 U.S.C. 154(b) by 0 days.

(21) Appl. No.: 09/177,133

(22) Filed: Oct. 22, 1998

(30) Foreign Application Priority Data

Oct. 22, 1997 (DE) .............................. 197 26 598

(51) Int. Cl.$^7$ ...................................... B32B 5/22
(52) U.S. Cl. ................... 428/293.4; 428/312.6; 428/314.4; 428/317.9; 428/319.1; 428/312.2
(58) Field of Search .............. 428/293.4, 312.2, 428/312.6, 314.4, 317.9, 319.1

(56) References Cited

U.S. PATENT DOCUMENTS 5,254,397 * 10/1993 Kawai et al. ..................... 428/293.4
5,536,574   7/1996 Carter .

OTHER PUBLICATIONS

T. Haug et al: "Herstellverfahren für oxidationsbeständige faserverstärkte Keramiken", Werkst.–Verfahrenstech., Symp. 6, Werkstoffwoche '96, Herausgeber: Ziegler, G., DGM Informationsgesellschaft, 1997, pp. 943–954.
Database WPI, Derwent Publications, Ltd., Section Ch, Week 9649, JP 08–253876 A, Oct. 1, 1996, Kawasaki Steel Corp.

"Ceramic composites for applications at extremely high temperatures," K.J. Huettinger et al., cfi/Ber.DKG 69 (1992) No. 11/12, pp. 445–460.
"Ceramic Coatings for Carbon–Carbon Composites," James R. Strife et al., Ceramic Bulletin, vol. 67, No. 2, 1988, pp. 369–374.
"Continuous Fibre–Reinforced Ceramics—A New Type of Material With New Performance Characteristics," M. Leuchs et al. Keramische Zeitschrift, 49 [1] 1997, pp. 18–22.
"Neuartige glaskeramische Oxidatinsschutzschicht für C–Faser–Verbundkeramiken," R. Dirscherl et al., Fortschrittsbericht DKG, Band 10, 1995, pp. 318–326.

* cited by examiner

Primary Examiner—Elizabeth M. Cole
(74) Attorney, Agent, or Firm—Crowell & Moring, L.L.P.

(57) ABSTRACT

A ceramic composite includes (a) 30 to 60% by volume of C-fibers; (b) 10 to 55% by volume of a matrix made of SiC and C, wherein the weight ratio SiC:C is in the range of between 20:1 and 2:1; (c) 5 to 40% by volume porosity that may be open or closed. A base material is formed from a)+b)+c). The ceramic composite also includes a protective system comprising at least one of (d) a lower protective layer that is situated directly on the base material consisting of one or more compounds comprising Si, C, B, $O_2$ and having a thickness between 20 and 150 $\mu$m; (e) a central protective layer that is situated above the lower protective layer consisting of at least one of transition metal borides and transition metal silicides in combination with SiC, $SiO_2$ or SiOC, and having a thickness of from 50 to 250 $\mu$m; and (f) an upper protective layer that is situated above the central protective layer consisting of one or more compounds comprising SiC, $SiO_2$, $MoSi_2$, $Mo_3Si$, $Mo_5Si_3$, ZrB, $ZrB_2$, $ZrB_{12}$, $Si_3N_4$, $ZrO_2$, $Y_2O_3$, $Al_2O_3$, mixed oxides $Al_2O_3$—$SiO_2$, and SiOC and having a thickness of from 20 to 250 $\mu$m.

37 Claims, 4 Drawing Sheets

EROSION-RESISTANT COVER LAYER

FUNCTIONAL INTERMEDIATE LAYER WITH CRACK SEALING

PRIMER

C/SIC-BASE MATERIAL
(0/90° FIBER ORIENTATION)

CERAMIC COMPOSITE

BACKGROUND AND SUMMARY OF THE INVENTION

This application claims the priority of German Patent Application No. 197 26 598.6, filed Oct. 22, 1997, the disclosure of which is expressly incorporated by reference herein.

The present invention relates to a ceramic composite reinforced by means of C-fibers. Fiber-reinforced ceramic composites have a high temperature stability and, in contrast to monolithic ceramics (i.e., ceramics that are not reinforced by fibers), have a low brittleness (i.e., a high tolerance with respect to damage). Fiber-reinforced ceramic composites are therefore well suitable for use as construction materials for high-temperature components in air and space travel, for example, as heat shields, hot leading wing edges or noses of space transport systems, engines of rockets or components of aircraft engines.

Because of the ratio of stability to density and/or stiffness to density, which is favorable at high temperatures, and because of the possibility of eliminating additional thermal insulation, fiber-reinforced ceramic composites can clearly save weight in comparison to current state of the art ceramics.

So far, known fiber-reinforced ceramic composites are carbon-fiber-reinforced carbon (abbreviated C/C) and carbon-fiber-reinforced silicon carbide (abbreviated C/SiC). Furthermore, composites have been developed that have fibers made of: SiC (for example, having the tradename TYRANNO and NICALON), $Al_2O_3$, the system $Al_2O_3$—$SiO_2$, or the system $Al_2O_3$—$SiO_2$—$B_2O_3$ (for example, having the tradename NEXTEL).

Because of an insufficient thermal stability of the fibers, known ceramic composites with fibers other than carbon C can only be used only at a maximum of 1,100° C. For many applications in air and space travel, this temperature limit represents an exclusion criterion. For example, when space transport systems or engine parts of rockets or airplanes reenter the earth atmosphere, they will clearly have higher temperatures.

On the other hand, all materials containing C-fibers are very sensitive to oxidation. For this reason, C/C can be used at high temperatures only in an oxygen-free atmosphere or in air for a very short time. Even C/SiC is generally not stable with respect to oxidation because (1) C-fibers oxidize from the direction of the edge and, (2) such materials are porous, thus oxygen reaches the C-fibers through the matrix pores and oxidizes the C-fibers.

It is an object of the present invention to provide a construction material particularly for use in air travel and space travel that meets the following requirements:

a) density <2.3 g/cm³;

b) applicable from ambient temperature to 1,600° C.;

c) tensile strength above 200 MPa, with simultaneous tolerance to damage, that is, without brittle fracture;

d) stability in an oxidizing atmosphere, particularly air;

e) at least 50 h of service life;

f) resistant to an at least 100-fold thermal shock; and g) economical manufacturability of complex structures.

No construction material has so far been known that meets all above-mentioned requirements simultaneously. The situation with respect to the individual requirements is as follows:

a) density <2.3 g/cm³ and b) applicable from ambient temperature to 1,600° C.

From the combination of these two requirements, it is concluded that the material must contain carbon.

c) Tensile strength above 200 MPa, with simultaneous tolerance to damage; that is, without brittle fracture.

This results in the necessity of having a ceramic composite that is reinforced by C-fibers. As the matrix, the following is conceivable: C, SiC, $Si_3N_4$, SiBCN, $SiBN_3C$, or similar materials. The C-fibers may be either short (i.e., chopped or cut fibers having a length of several millimeters to a few centimeters) or endless (i.e., not chopped or uncut and coming from a spool having a length of several hundreds of meters).

d) Stability in an oxidizing atmosphere, particularly air.

For avoiding the oxidation of C-fibers, an oxidation protection system is required. External protective layers are customary, as described, for example, in S. Goujard et al., *The oxidation behavior of two- and three-dimensional C/SiC thermostructural materials protected by chemical-vapor-deposition polylayers*, 29 J. Mater. Sci. 6212–6220 (1994).

e) More than 50 h of service life in the temperature range 20–1,600° C.

Protective systems that protect the C-fibers in the ceramic composites for more than 50 h in the whole temperature range of 20–1,600° C. from oxidation are not known. Because even improved protective systems would not be sufficient for protecting a carbon matrix against oxidation for this long, only SiC, $Si_3N_4$, SiBNC or similar non-oxides can be used as the matrix. Oxides, such as $Al_2O_3$ and $ZrO_2$ are not compatible with the C-fiber.

f) Resistant to an at least 100-fold thermal shock.

Particularly when combined with the condition that the material must be usable in the whole temperature range of from 20° C. to 1,600° C., this requirement represents a demand that is higher than e). Such material systems are not the state of the art: M. P. Bacos & O. Sudre, *Critical review on oxidation protection for carbon-based composite in High-temperature ceramic-matrix composites*, Ceramic Transactions, Vol. 57 (1995); J. Strife & J. Sheehan, *Ceramic coating for carbon-carbon composites*, Ceramic Bull. 67(2) 369 (1988).

g) Economical manufacturability of complex structures.

For an extremely light construction in air and space travel, integral structures are desired analogous to those that are currently manufactured from C-fiber-reinforced plastic materials. A manufacturing process for C-fiber-reinforced ceramic composites that is derived therefrom and also approaches the final ceramic composite is the polymer infiltration and pyrolysis process as disclosed in U. Trabant et al., *Test results of low cost C/SiC for martian entry and reusable launcher*, Proceedings 47th Intern. Astronautical Cong., China (1996); W. Schaefer et al., *Hot aerospace structures from fiber reinforced ceramics*, Proceedings 17th Conf. Aerospace Material Engineering, Paris (1997); T. Haug et al., *Herstellverfahren für oxidationsbeständige faserverstärkte Keramiken*, Proceedings "Werkstoffwoche '96", DGM/DKG, Stuttgart (1996). Further background information is available in M. Balat et al., *Active to passive transition in the oxidation of silicon based ceramics at high temperatures*, Proceedings "3rd European Workshop on High Temperature Materials" ESA (1996). It is therefore applicable here.

The object of the present invention is a material that meets the above-mentioned requirements a) to g) and has the following characteristics:

I. Reinforcing fibers made of C;

II. A matrix made of SiC+C (5–30% by weight excess carbon);

III. Pores;

IV. A lower oxidation protection layer having the function of a primer and surface sealing with a coefficient of thermal expansion adapted to the base material, made of one or several materials SiC, $SiO_2$, B;

V. A central oxidation protection layer having the function of an oxygen getter by oxide formation and/or local crack sealing by glass formation from one or several Si-containing or B-containing compounds, such as $MoSi_2$, $Mo_3Si$, $Mo_5Si_3$, SiC, BN, $B_4C$, $Si_3N_4$, $SiB_6$, $TaB_2$, B, SiBCN, $SiBN_3C$ or similar compounds;

VI. An upper oxidation protection layer having the function of the erosion protection and the adaptation of radiation emission and absorption, made of one or several of the materials SiC, $MoSi_2$, $Mo_3Si$, $Mo_5Si_3$, ZrB, $ZrB_2$, $ZrB_{12}$, $Si_3N_4$, $ZrO_2$, $Y_2O_3$, $Al_2O_3$, system $Al_2O_3$—$SiO_2$;

VII. The above-mentioned three oxidation protection layers may be composed of partial layers. By means of several partial layers adapted to individual partial temperature intervals, an oxidation protection can be achieved that has a continuously optimal effect from 20° C. to 1,600° C. because individual materials in each case can optimally provide oxidation protection in only limited temperature ranges.

VIII. Manufacturability of the base material by way of the polymer infiltration and pyrolysis process with the object of obtaining complex light-construction structures. Polymer precursors that contain phenolic resin are favorable for the processing. The resulting C-excess is protected from an attack by oxygen by the surrounding SiC matrix and the oxidation protection system.

In contrast to the prior art, the following is new and inventive:

α) The C-excess in the matrix facilitates economical manufacturability, but is acceptable only if the oxidation protection system has a sufficiently good effect.

β) The combination of the materials in the at least 3-layer oxidation protection system covers not only individual temperature intervals, but also the whole range between from 20° C. to 1,600° C.

γ) The adaptation of the thermal expansion of protective layer systems with respect to one another and to the base material in parallel and transversely to the fiber direction in order to achieve a high thermal shock resistance.

Other objects, advantages and novel features of the present invention will become apparent from the following detailed description of the present invention when considered in conjunction with the accompanying drawings.

EXAMPLE

Test pieces and components were produced by means of the polymer infiltration by way of fiber windings and laminating processes, as they are customary in fiber composite technology, as well as by way of a following pressureless pyrolysis at 1,600° C. in protective gas. As the starting materials, C-fibers were used of the TYPE T800 (from Toray) as well as pyrolyzable polymers and inorganic fillers. After the pyrolysis, the interior porosity was repeatedly refiltered by means of a pyrolyzable Si-polymer and again pyrolyzed at 1,600° C. This resulted in a composite of the following composition:

45% by volume C-fibers, oriented in the 0°/90° direction;

30% by volume SiC;

5% by volume C; and

20% by volume pores.

The three latter constituents form the matrix.

A multi-layer oxidation protection system was applied to this composite. For this purpose, suitable slips consisting of inorganic slip constituents and organic binders and solvents were spread on and subsequently burnt in at temperatures of between 900° C. and 1,400° C. in a protective gas. By means of this process, the following layer system was implemented:

1) a lower layer directly on the ceramic composite of a thickness of 30 μm and consisting of SiC;

2) a central layer of a thickness of 150 μm and consisting of 5 partial layers made of transition metal borides and silicides; and 3) an upper layer of a thickness of 30 μm and consisting of SiC.

Figure 1:
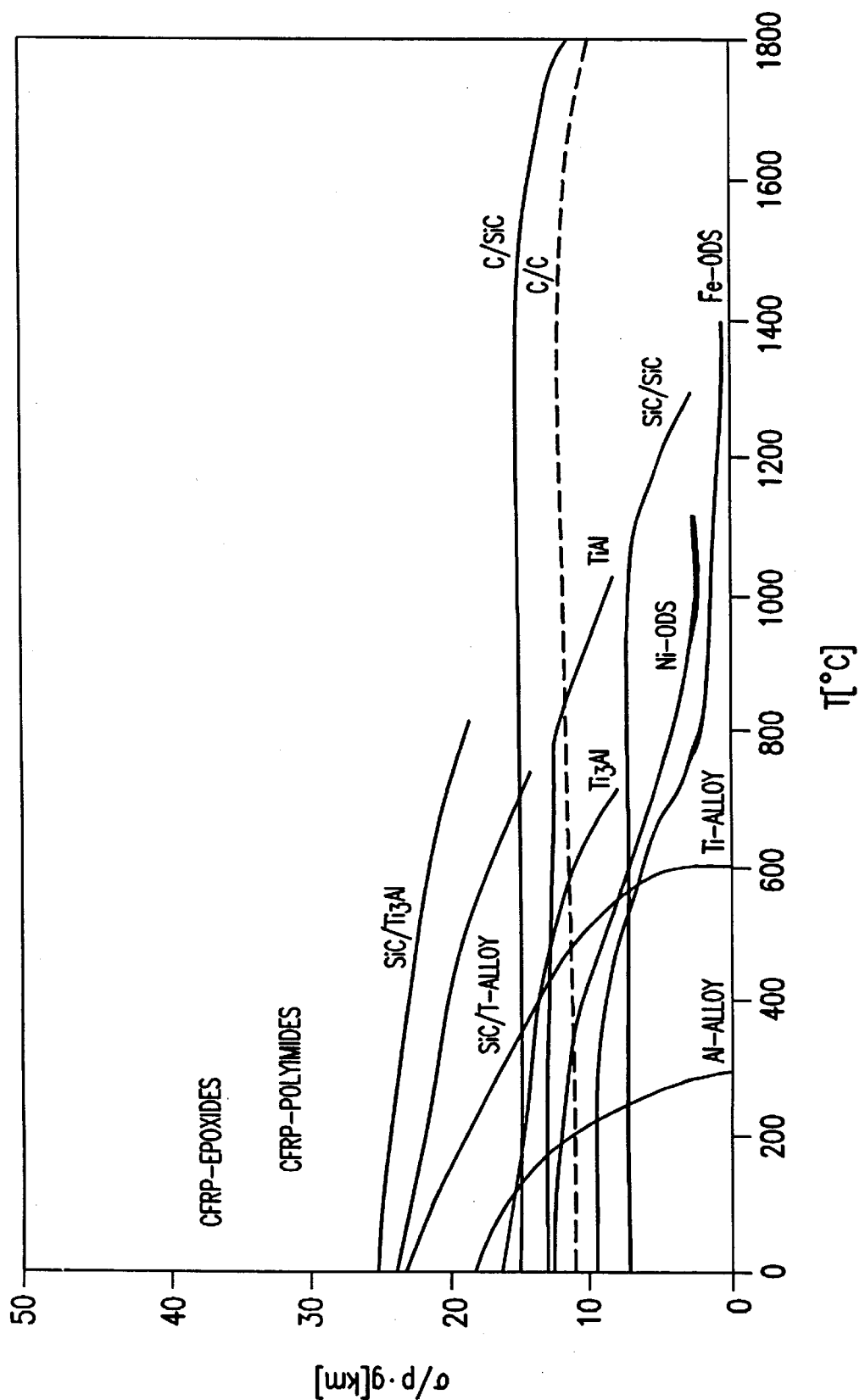
FIG. 1 is a view of the specific stability as a function of the temperature.
Figure 2:
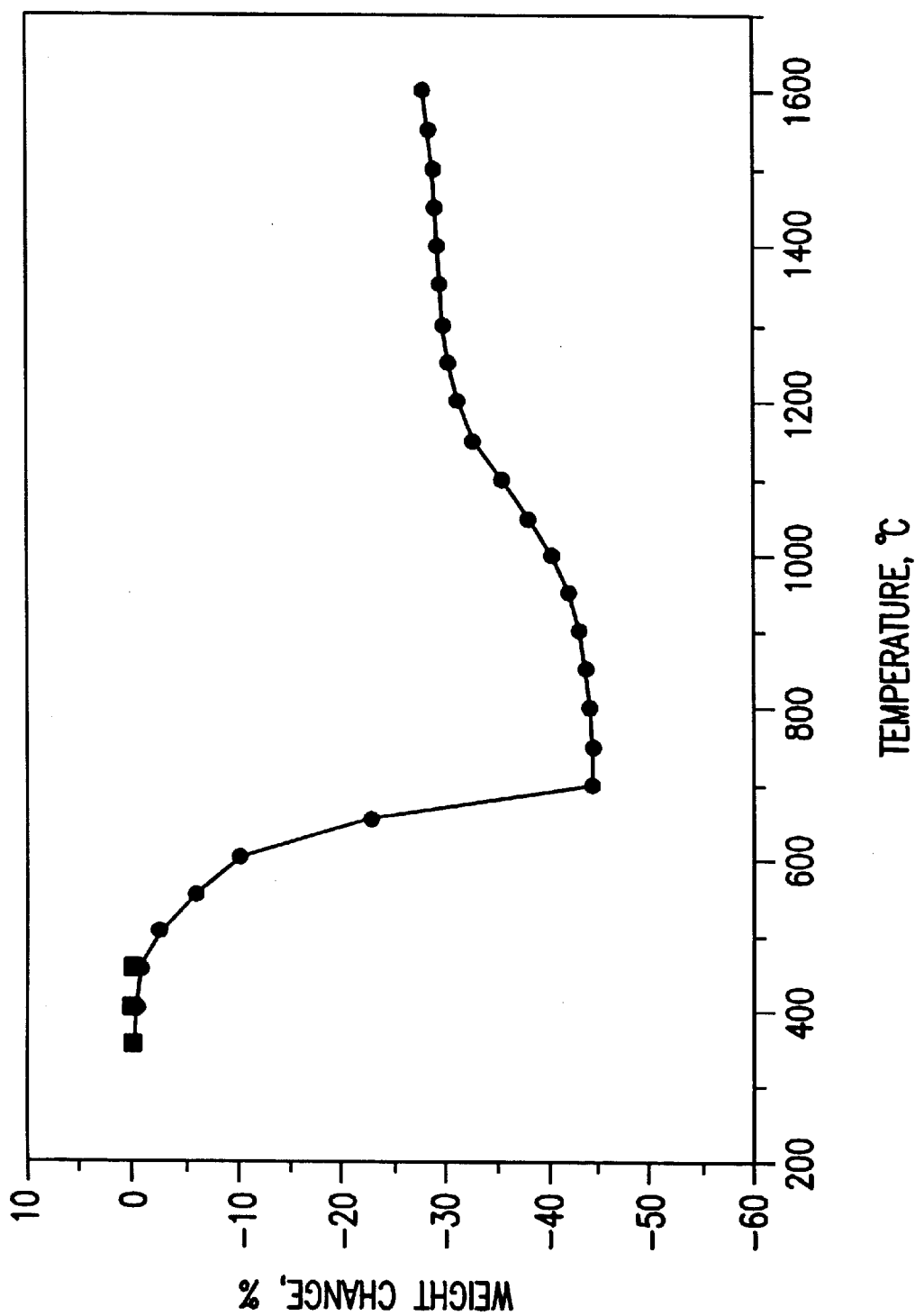
FIG. 2 is a view of the weight change as a function of the temperature in a graduated oxidation test (one hour respectively of aging at a corresponding temperature with a subsequent determination of the weight at room temperature, RT)
Figure 3:
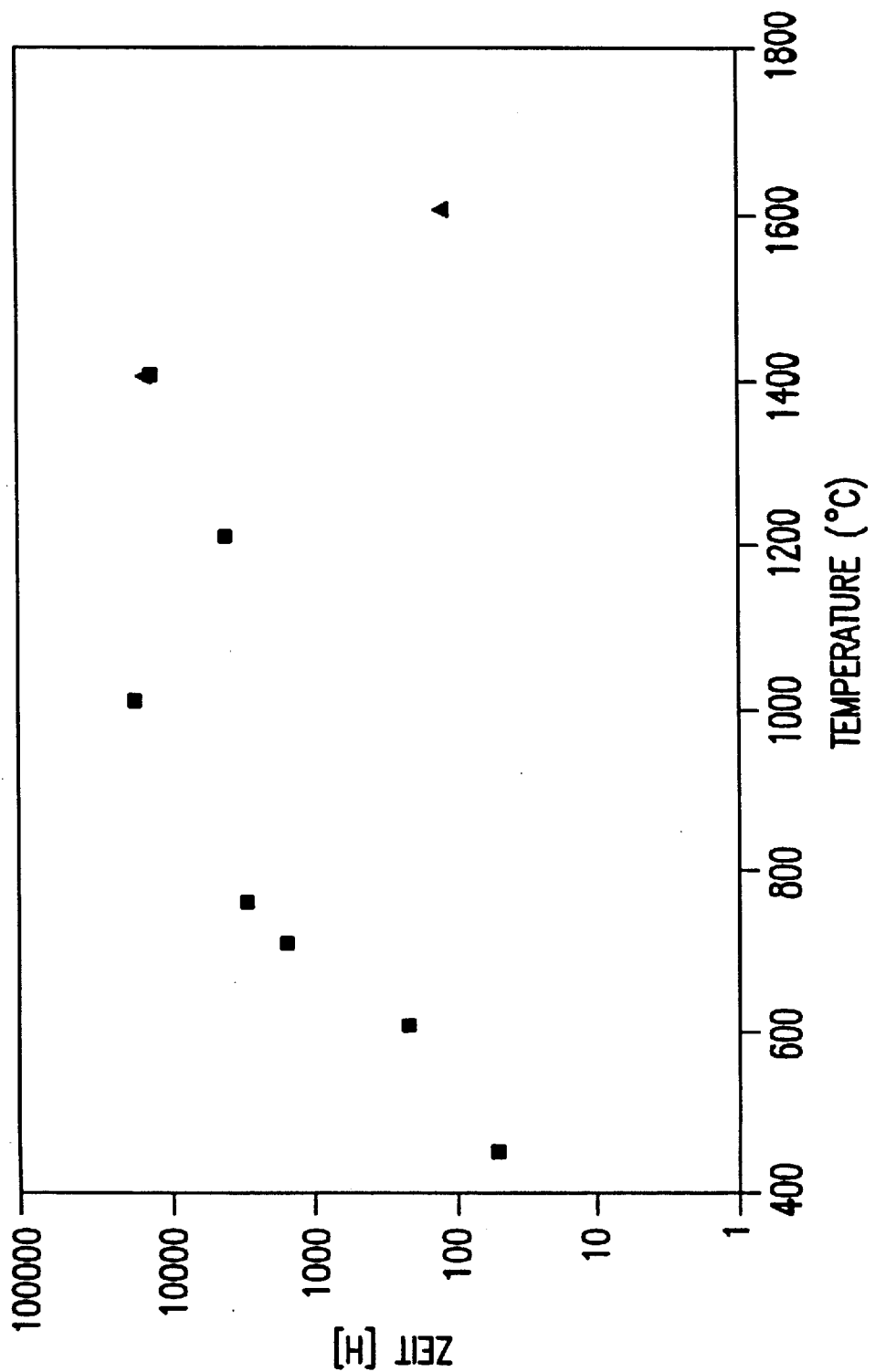
FIG. 3 is a view of long-time oxidation resistance in air, measured by the weight change, 3% decrease or increase being assessed as the stability limit.
Figure 4:
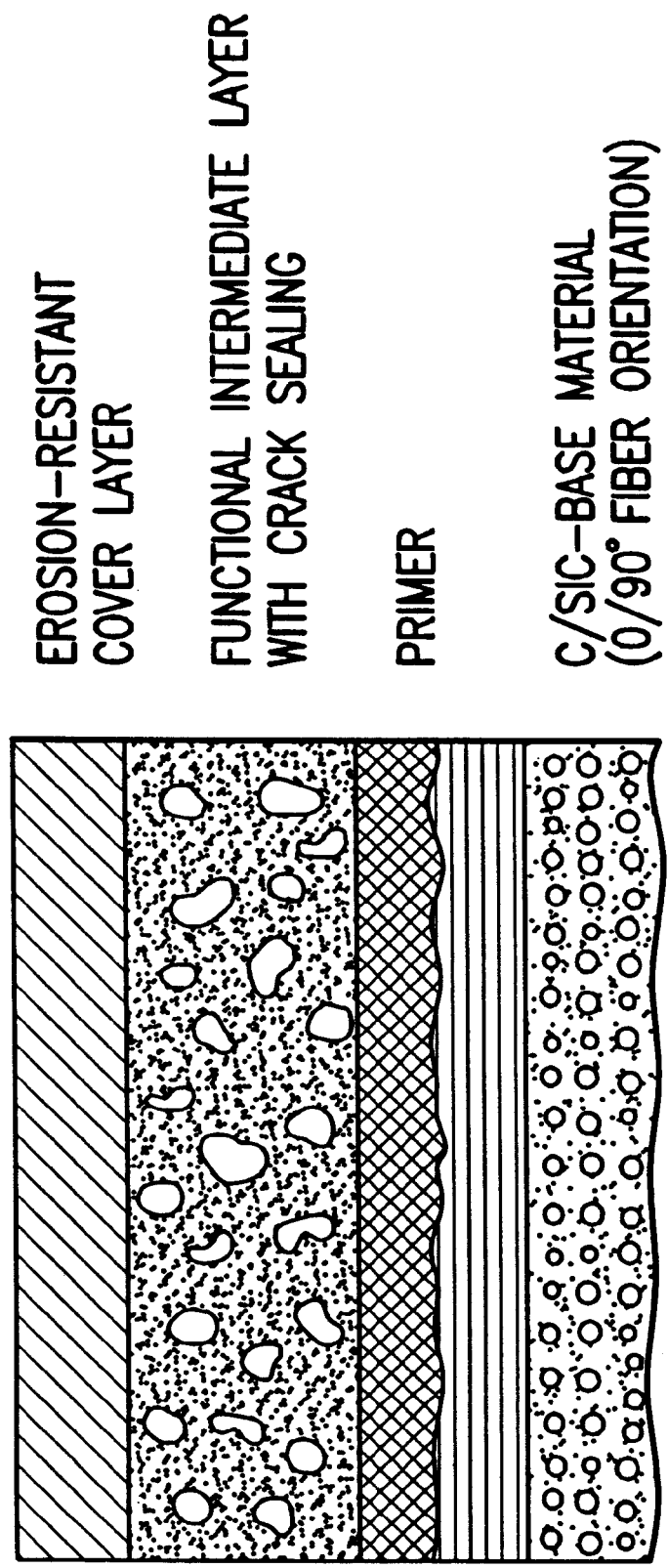
FIG. 4 is a diagram of the base material and of the protective layer system.

This material has a density of 1.8 g/cm³;

a tensile strength of 250 MPa at ambient temperature;

a tensile strength of 280 MPa at 1,600° C.;

an oxidation resistance for more than 50 h in the temperature interval of 450° C. to 1,600° C. (FIG. 3) and for more than 1,000 h, between 750° C. and 1,400° C.;

a detected resistance to 100-fold thermal short-time cyclization (thermal shock) for the temperature interval of 400 to 1,250° C.;

a graduated coefficient of thermal expansion in the whole material system, as follows:

Upper layer: $5.4 \times 10^{-6}$ $K^{-1}$=smaller than central function layer, therefore stabilized by compressive strains after the cooling from the manufacturing temperature Central layer: $6.9 \times 10^{-6}$ $K^{-1}$=maximal value of all layers, pushes into gaps Lower layer: $5.4 \times 10^{-6} K^{-1}$=between base material and central layer Base material: $1.8 \times 10^{-6}$ $K^{-1}$ (in the fiber direction at 0°/90° layer construction); $6.8 \times 10^{-6}$ $K^{-1}$ (transversely to the fiber direction at 0°/90° layer construction)

The values relate to the temperature interval of 200° C. to 1,000° C.

The foregoing disclosure has been set forth merely to illustrate the present invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A ceramic composite, comprising:

a) 30 to 60% by volume of C-fibers;

b) 10 to 55% by volume of a matrix made of SiC and C, wherein the weight ratio SiC:C is in the range of between 20:1 and 2:1;

c) 5 to 40% by volume porosity that may be open or closed;

wherein a)+b)+c) form a base material; and a protective system comprising:

d) a lower protective layer that is situated directly on the base material consisting of one or more compounds comprising Si, C, B, $O_2$ and having a thickness between 20 and 150 $\mu$m;

e) a central protective layer that is situated above the lower protective layer consisting of a transition metal boride and a transition metal silicide in combination with SiC, $SiO_2$, or SiOC, and having a thickness of from 50 to 250 $\mu$m; and f) an upper protective layer that is situated above the central protective layer consisting of one or more compounds comprising SiC, $SiO_2$, $MoSi_2$, $Mo_3Si$, $Mo_5Si_3$, ZrB, $ZrB_2$, $ZrB_{12}$, $Si_3N_4$, $ZrO_2$, $Y_2O_3$, $Al_2O_3$, mixed oxides $Al_2O_3$—$SiO_2$, and SiOC and having a thickness of from 20 to 250 $\mu$m.

2. The ceramic composite according to claim 1, wherein the transition metal borides and transition metal silicides act as oxygen getters by oxide formation.

3. The ceramic composite according to claim 1, wherein the transition metal borides and transition metal silicides act as glass forming agents and thereby seal local cracks.

4. The ceramic composite according to claim 1, wherein the lower protective layer closes the porosity of the base material on the surface.

5. The ceramic composite according to claim 1, wherein the lower protective layer has a coefficient of thermal expansion ($\alpha_{20}$) from $3\times10^{-6}$ $K^{-1}$ to $6\times10^{-6}$ $K^{-1}$ and is parallel to the base material and transverse to the C-fibers.

6. The ceramic composite according to claim 1, wherein the upper protective layer acts as an erosion protector.

7. The ceramic composite according to claim 1, wherein the upper protective layer has an emissivity of between 0.6 to 0.95.

8. The ceramic composite according to claim 1, wherein the lower protective layer consists of up to three partial layers.

9. The ceramic composite according to claim 1, wherein the central protective layer consists of up to eight partial layers, each having partially or completely different compositions and which, at different temperatures, become active as at least one of glass forming agents for sealing cracks and oxygen getters.

10. The ceramic composite according to claim 1, wherein the upper protective layer consists of up to 5 partial layers.

11. The ceramic composite according to claim 1, wherein the base material is produced by polymer infiltration and pyrolysis.

12. The ceramic composite according to claim 1, wherein the matrix is formed of a Si-organic polymer and additional carbon.

13. The ceramic composite according to claim 1, wherein the matrix is produced by reaction binding from a C-precursor polymer and Si.

14. The ceramic composite according to claim 13, wherein the C-precursor polymer comprises phenolic resin.

15. The ceramic composite according to claim 1, wherein the matrix is formed of a mixture of Si-organic precursor polymers and pure C-precursor polymers.

16. The ceramic composite according to claim 12, wherein the matrix is formed by reinfiltration with a matrix precursor polymer or with Si-polymers and subsequent pyrolysis for reducing porosity.

17. The ceramic composite according to claim 1, wherein the C-fibers are previously C-coated.

18. The ceramic composite according to claim 1, wherein the C-fibers are endless.

19. The ceramic composite according to claim 1, wherein the C-fibers are short fibers.

20. An aircraft or spacecraft part comprising the ceramic composite according to claim 1.

21. The aircraft or spacecraft part according to claim 20, wherein said part is selected from the group consisting of a reentry heat shield, a wing, a nose, an engine, an engine nozzle, and a rocket.

22. A method for increasing the efficiency of the protective system for the ceramic composite according to claim 1, comprising oxidizing pretreatment at from 900° C. to 1,400° C.

23. The ceramic composite according to claim 1, wherein the protective layers are applied by spreading, rolling, dipping, flooding or spraying and then burning-in.

24. The ceramic composite according to claim 23, wherein the application of the protective layers is by slips consisting of inorganic fillers, organic binding agents and solvents.

25. The ceramic composite according to claim 1, wherein at least one of the lower protective layer and the upper protective layer are applied by chemical vapor deposition.

26. The ceramic composite according to claim 1, wherein the base material has a roughness Ra of at least 5 $\mu$m.

27. The ceramic composite according to claim 1, wherein at least one of an alkali-containing and an alkali-earth-containing salt is added to at least one protective layer, thereby improving glass formation.

28. The ceramic composite according to claim 1, wherein said composite has a density less than 2.3 g/m$^3$ and a tensile strength of above 200 MPa.

29. The ceramic composite according to claim 28, wherein said composite has an oxidation resistance for more than 50 hours at a temperature between 450° C. and 1,600° C.

30. The ceramic composite according to claim 28, wherein said composite has an oxidation resistance for more than 1,000 hours at a temperature between 750° C. and 1,400° C.

31. The ceramic composite according to claim 28, wherein said composite is heat resistant to a more than 100-fold heating and cooling at 2 K/sec. between 400° C. and 1,250° C.

32. The ceramic composite according to claim 24, wherein the organic binding agents are converted during the burning-in into inorganic constituents of the protective layers.

33. The ceramic composite according to claim 1, wherein the matrix comprises Si, B, N, and C.

34. The ceramic composite according to claim 33, wherein the matrix comprises $SiBN_3C$ or SiBCN.

35. The ceramic composite according to claim 1, wherein the matrix further comprises at least one of nitrides, borides or silicides for internal oxidation protection.

36. The ceramic composite according to claim 35, comprising $SiB_6$, $MoSi_2$, and $Si_3N_4$.

37. The ceramic composite according to claim 1, wherein said composite is oxidation resistant at a temperature between 20° C. and 1,600° C.

* * * * *